（12）United States Patent
Nichols et al.

(10) Patent No.: US 8,588,028 B2
(45) Date of Patent: Nov. 19, 2013

(54) SLANT-STACK FOR TIME GATHER TO ANGLE GATHER CONVERSION

(75) Inventors: David Nichols, Houston, TX (US); Madhav Vyas, Houston, TX (US); Everett C. Mobley, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 813 days.

(21) Appl. No.: 12/763,294

(22) Filed: Apr. 20, 2010

(65) Prior Publication Data

US 2011/0069582 A1  Mar. 24, 2011

Related U.S. Application Data (60) Provisional application No. 61/244,594, filed on Sep. 22, 2009.

(51) Int. Cl.
*G01V 1/00* (2006.01)
(52) U.S. Cl.
USPC ............................................ 367/73; 702/18
(58) Field of Classification Search
USPC ............................................ 702/18; 367/73
See application file for complete search history.

(56) References Cited

U.S. PATENT DOCUMENTS

| 4,779,238 | A | 10/1988 | Howard |
| 6,546,339 | B2 * | 4/2003 | Bevc et al. .................. 702/18 |
| 6,574,567 | B2 | 6/2003 | Martinez |
| 6,985,405 | B2 | 1/2006 | Ren et al. |
| 2002/0049540 | A1 * | 4/2002 | Bevc et al. .................. 702/2 |
| 2007/0271041 | A1 | 11/2007 | Peng |

OTHER PUBLICATIONS

PCT Search Report, dated Apr. 26, 2011, Application No. PCT/US2010/048760.
Biondi, et al., Angle-Domain Common-Image Gathers for Migration Velocity Analysis by Wavefield-Continuation Imaging, Geophysics, Sep.-Oct. 2004, pp. 1283-1298, vol. 69, No. 5.
Fehler, et al., SEG Advanced Modeling(SEAM): Phase I First Year Update, The Leading Edge, Aug. 2008, pp. 1006-1007.
Sava, et al., Time-Shift Imaging Condition in Seismic Migration, Geophysics, Nov.-Dec. 2006, pp. S209-S217, vol. 71, No. 6.

* cited by examiner

*Primary Examiner* — Mark Hellner (57) ABSTRACT

A method to correct errors in a conversion from time gather to angle gather using slant stacks wherein the slant stacking is performed along a direction that is normal to a dip or along three orthogonal directions. The slant stacking is performed in various domains.

22 Claims, 9 Drawing Sheets

SLANT-STACK FOR TIME GATHER TO ANGLE GATHER CONVERSION

CROSS-REFERENCE TO RELATED APPLICATIONS

The present application claims priority under 35 U.S.C. §119(e) to U.S. Provisional Application Ser. No. 61/244,594 filed on Sep. 22, 2009, with the same title and by the same inventors.

BACKGROUND OF THE INVENTION

1. Field of the Invention

This invention relates data processing for geophysical exploration, more specifically related to using slant-stack for time gather to angle gather conversion.

2. Description of the Related Art

For background information regarding conversion from time gather to angle gather, one may refer to a paper by Sava and Fomel (2006), "Time-shift imaging condition in seismic migration" published in Geophysics, Vol 71, Issue 6. They proposed time shifted imaging conditions and also the equations to convert time shift gathers to angle gathers. We observe limitations of the proposed equation and suggest an alternative to overcome the shortcoming.

Conversion of time gathers to angle gathers involves an intermediate step of slant-stacking Sava and Fomel (2006) proposed the slant-stack to be carried out along Z-axis followed by the dip correction. However, we believe that the results of time to angle gather conversion using the proposed scheme start being inaccurate for dips with large angles, for example, angles greater than sixty degrees, and the method totally fails for a near vertical reflector (ninety degree dip).

It is desirable to have a method and an apparatus to correct the inaccuracies.

BRIEF SUMMARY OF THE INVENTION

We propose a new way to slant stack in order to overcome the limitations mentioned above.

First, we propose to slant stack along all three coordinate axes, followed by corresponding dip correction for each and stacking the gathers obtained for three directions with appropriate weights thereafter.

Second, we propose to carry out the slant stack normal to the dip direction. We estimate the dip field from zero lag section which is input to a proposed algorithm. Instead of carrying out the two step process of slant stacking along coordinate axes and the dip correction, we propose to carry out just one slant stack normal to the dip direction. This would overcome the dip limitation discussed earlier. It also has two other apparent benefits, one, better resolution and two, lower cost of slant stack.

Third, we propose to carry out the slant stack normal to the reflector dip (for all possible dips) in the wavenumber domain instead of space domain. This is similar to the idea of slant stacking normal to the dip, but instead of explicitly picked dip field we implicitly calculate it using wavenumbers. The method inherits the advantages stated above from the earlier approach and also it does not have any dependency on the dip field, which has practical benefits as the quality of gathers is no more dependent upon the quality of the estimated dip field.

BRIEF DESCRIPTION OF THE SEVERAL VIEWS OF THE DRAWINGS

A better understanding of the invention can be had when the following detailed description of the preferred embodiments is considered in conjunction with the drawings.

DETAILED DESCRIPTION OF THE INVENTION

Conversion of time gathers to angle gathers involves an intermediate step of slant-stacking Sava and Fomel (2006) proposed the slant-stack to be carried out along the Z-axis followed by the dip correction. When the reflector is horizontal (i.e. the dip angle is zero degree, or the normal to the reflector is along the Z-axis), the results from their method are perfect. However, when the dip angle increases, the accuracy of their method decreases. The results of time to angle conversion using their method become unacceptably poor for large dip angles, i.e. greater than sixty degrees. The method totally fails for a vertical reflector (ninety degree dip).

Several extended imaging conditions have been proposed over the last few years for wavefield extrapolation based migration methods. They amount to cross-correlating the source and the receiver wavefield not only at the conventional zero space and time lag but also at non-zero shifts both in space and time. The time lag imaging condition as proposed by Sava and Fomel (2006) is given in equation (1).

$$I(x,y,z,\tau) = U(x,y,z,t+\tau) * D(x,y,z,t-\tau) \quad (1)$$

Here, I is the image, x, y and z represent the coordinates of the image point, t is time and τ is the time lag. U and D denote the source and the receiver wavefields respectively. * denotes cross-correlation. By using the proposed imaging condition we obtain an image with one extra dimension i.e. time lags. These time lag gathers can find different applications. One of those can be to convert the observed time lags to angles, which can subsequently be used for migration velocity analysis or for improving the image quality through stacking along angles. To compute the opening angles we need to formulate a transformation from time lags to angles. Sava and Fomel (2006) derive equation (2) to relate the opening angle (θ) with the partial derivatives ($\tau_x$, $\tau_y$, and $\tau_z$) of time lag(τ) with respect to the X, Y and Z coordinate axes.

$$\cos^2\theta = \frac{|\nabla_m 2\tau|^2}{4s^2(m)} = \frac{\tau_x^2 + \tau_y^2 + \tau_z^2}{s^2(x,y,z)} \quad (2)$$

m is the location vector for the image point expressed in terms of x, y and z coordinates. s is slowness. However, for the sake of implementation Sava and Fomel (2006) rewrite the above equation as, $$\cos^2\theta = \frac{\tau_z^2}{s^2(x,y,z)}(1 + z_x^2 + z_y^2) \quad (3)$$

The first term on the right hand side corresponds to calculating the partial derivative of time lag with respect to the z axis. The slope of the events in time lag sections correspond to these partial derivatives, for instance, $\tau_z$ would correspond to the slope of events in the z-$\tau$ section. In practice it is measured through slant stack and the slant stack parameter has the same units as that of the slowness. The slant stack parameter is a function of local slowness, dip and azimuth of the reflector and the opening angle. However, in our implementation we measure $1/\tau_z$ instead of $\tau_z$ and consequently the slant stack parameter has units of velocity instead of slowness. The second term $(1+z_x^2+z_y^2)$ on the right hand side is the dip-correction term. It is exactly equal to 1 for a horizontal reflector. The dip correction factor is equivalent to $\sec^2(\phi)$, where $\phi$ is the dip angle relative to the z axis.

Converting a time lag gather to angle gather as suggested by Sava and Fomel (2006) is a two step process. The first step is to carry out the slant stack itself, and the second step is applying the angle transform to convert the slant stack parameter to angles. But, equation (3) requires large apparent velocities for slant stack and is increasingly inaccurate for steep dips (i.e. dips with angles about or greater than 60 degrees). One reason for the inaccuracy is the limited resolution of slant stack. In the limit, the time gather for a vertical reflector (dip=90 degrees) would stack at infinite velocity. Also, the time gather will have no sensitivity to such an event.

Figure 1:
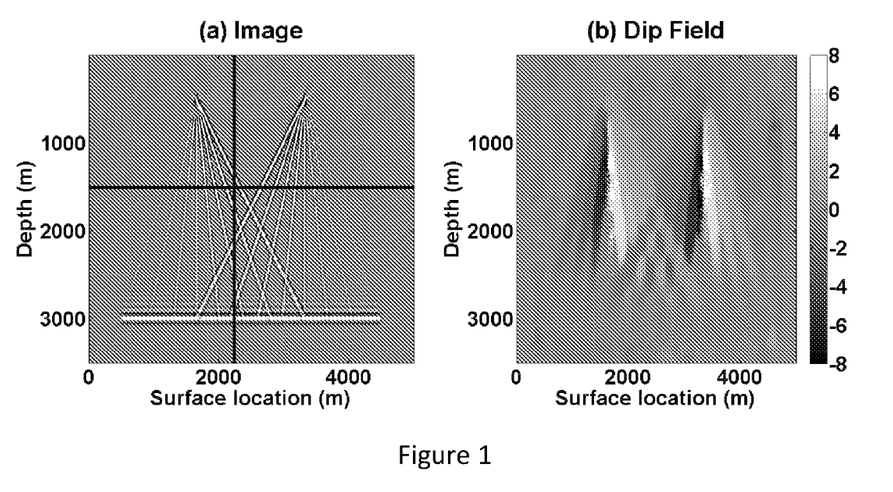
FIG. 1(a) is the image created using reverse time migration and FIG. 1(b) is the corresponding dip field.
Figure 2:
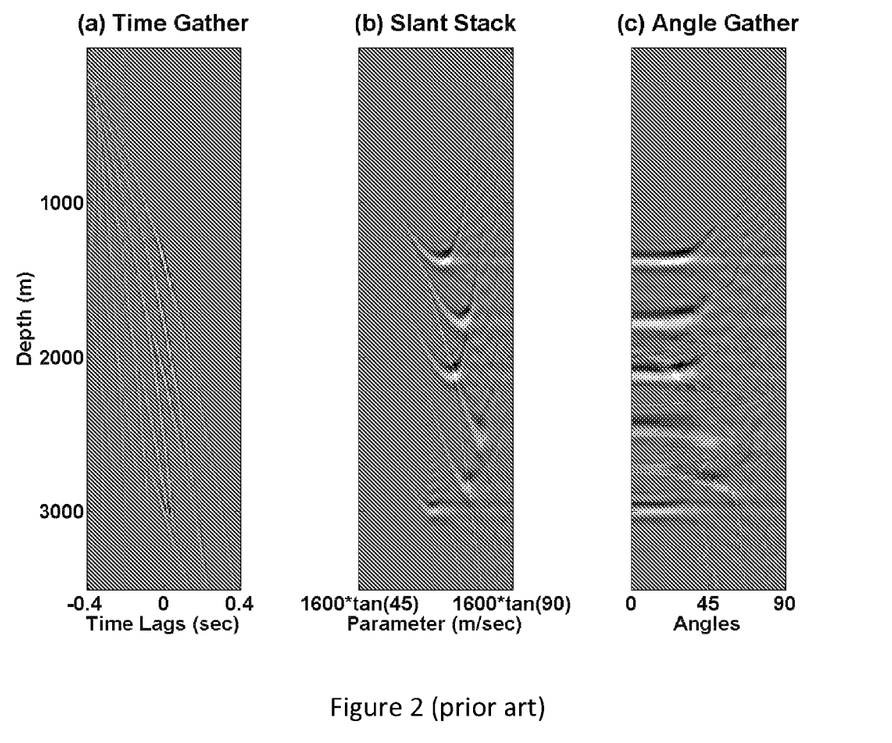
FIG. 2(a) is a z-τ time gather extracted at an x location marked on the image in FIG. 1(a).
FIG. 2(b) is the corresponding slant stack.
FIG. 2(c) is the angle gather for the same x location.
Figure 3:
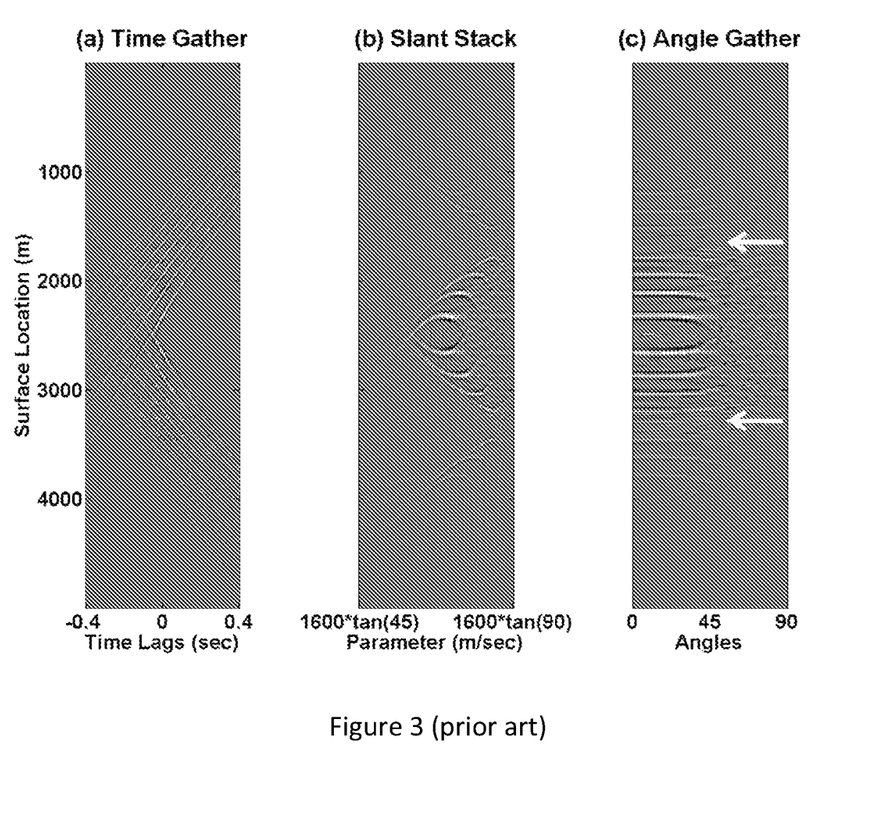
FIG. 3(a) is an x-τ time gather extracted at a z location marked on the image in FIG. 1(a).
FIG. 3(b) is the corresponding slant stack.
FIG. 3(c) is the angle gather for the same z location.

The following example shows that resolution is lost for steeply dipping events and one cannot capture a vertical reflector at all with the method proposed by Sava and Fomel (2006). The model used has two sets of intersecting dipping reflectors with dips ranging from 50 to 120 degrees. Each set has eight reflectors and the dip increment between the reflectors is 10 degrees. FIG. 1(a) is the image created using reverse time migration and FIG. 1(b) is the corresponding dip field estimated using plane-wave annihilation. The horizontal and the vertical lines in FIG. 1(a) indicate the z location and x location respectively that will be used in later examples. FIG. 2(a) is a z-$\tau$ time gather extracted at an x location marked on the image in FIG. 1(a). FIG. 2(b) is the corresponding slant stack, where the slant stack parameter is expressed as a constant times the tangent of an angle. When the angle is 45 degrees the slant stack parameter is equal to the constant (tan(45)=1); when the angle is 90 degrees the slant stack parameter is equal to infinity (tan(90)=∞). This was done to span a large range of velocity values. The sampling is uniform in angle. FIG. 2(c) is the angle gather for the same x location. Similarly, we show an x-$\tau$ time gather, slant stack gather and an angle gather in FIGS. 3(a), 3(b) and 3(c), for the z location marked on the image in FIG. 1(a). Same locations are used in examples throughout this paper. The events marked by the arrows on FIG. 3(c) are the vertical events, events between the two arrows have a dip lesser than 90 degrees, whereas, events outside the arrows have dip greater than 90 degrees (overturned events). Notice that the vertical events, overturned events and the events close to the vertical are virtually missing from these gathers as the slant stack failed to capture these events.

The methods described below will not have the problems or limitations as in the method described by Sava and Fomel (2006).

Slant Stacking Along All Three Coordinates:

In this approach slant stacks are performed along all the three orthogonal coordinate axes X, Y and Z, instead of Z axis only, and summed with appropriate weights. This covers all the possible reflector geometries and does not have any singularities. It amounts to the following equation, $$\cos^2\theta = \frac{w_x \tau_x^2}{s^2(x,y,z)}(1 + x_y^2 + x_z^2) + \quad (4)$$

$$\frac{w_y \tau_y^2}{s^2(x,y,z)}(y_x^2 + 1 + y_z^2) + \frac{w_z \tau_z^2}{s^2(x,y,z)}(z_x^2 + z_y^2 + 1)$$

Figure 4:
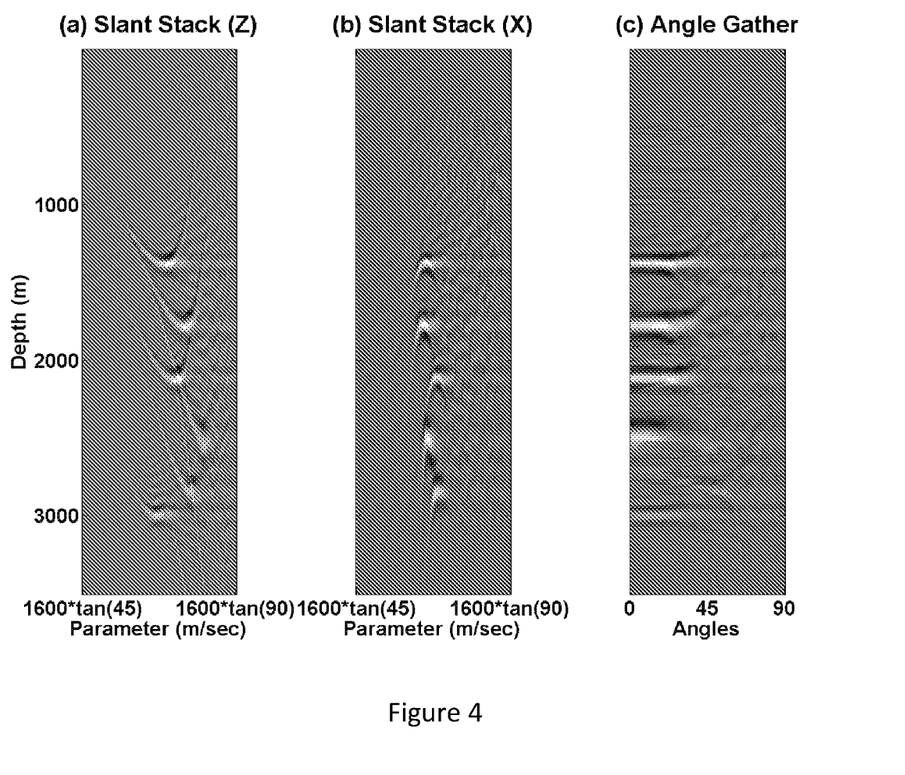
FIGS. 4(a) and 4(b) show slant stacks of z-τ gathers along Z and X axis respectively.
FIG. 4(c) shows the angle gather according to one embodiment.
Figure 5:
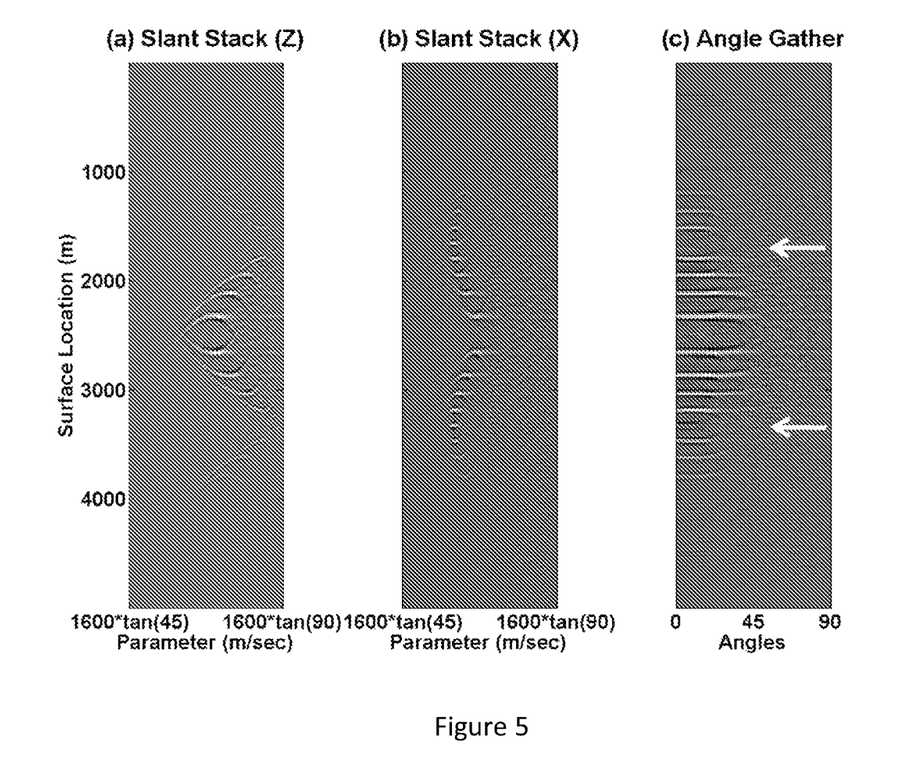
FIGS. 5(a) and 5(b) show slant stacks of x-τ gathers along Z and X axis respectively.
FIG. 5(c) shows the angle gather according to one embodiment

$w_x$, $w_y$ and $w_z$ are weights. Each term expresses the relationship between angle-dependent data, time shift, and opening angle observed along one coordinate axis. These weights are dip dependent and their sum is equal to one. In one implementation, these weights are set to equal to the direction cosines of the reflector normal. For a horizontal event (zero dip), both $w_x$ and $w_y$ are equal to zero and $w_z$ equals 1. In that case equation (4) is equivalent to equation (3). Notice, there are different dip correction terms corresponding to slant stacks in different directions. FIGS. 4(a) and 4(b) show a z gather for the given x location when slant stack was done along the Z and the X axis respectively. FIG. 4(c) is the angle gather using a combination of both as suggested by equation (4). Similarly, FIGS. 5(a), 5(b) and 5(c) show the slant stacks and angle gather for the marked z location. Notice the events around the arrows marked on FIG. 5(c), there is a substantial improvement in these events when compared to the ones in FIG. 3(c). However, the vertical event indicated by the arrow is still absent from the plot. The reason is an inaccurate dip field (FIG. 1(b)) for the vertical event. Although in the method proposed, we overcome the dip limitation of original Sava and Fomel (2006) method by slant stacking along all three coordinate axes, we still need to apply the dip correction. In order to do so, we would need an explicit measurement of the dip field and hence our final result will be limited by its quality.

Slant Stacking Along the Direction Normal to the Reflector Dip:

In a second method, which is a more accurate alternative, one does the slant stack normal to the reflector dip. The dip field is now an input to the slant stack itself. This method will not have any dip limitation whatsoever because stacking normal to the dip can be thought of as rotating the coordinate system such that the reflector appears horizontal (dip correction term is equal to one for a horizontal event). Also, the resolution of angle gathers will be better. The dip correction term of equations (3) and (4) acts as a stretch factor, which decreases the resolution by smearing the events, greater the dip, greater the stretch. By slant stacking normal to the dip we avoid the need for using this stretch term and hence the angles are better resolved. Another advantage of stacking normal to the dip is the cost of slant stack. When the slant stack is done along the coordinate axes we need to span a fairly large range of velocities for slant stack, in the limit, for dips ranging from zero to 90 degrees, one needs to span velocities starting from the local velocity all the way to infinite velocity (very high velocity). Whereas, if the slant stack is done normal to the dip, one needs to span a relatively smaller velocity range. For example, velocities ranging from local velocity to twice that velocity are typically sufficient. The reduced velocity range makes the process cost effective. Slant stacking normal to the dip would amount to the following equation, $$\cos^2\theta = \frac{\tau_m^2}{s^2(x, y, z)} \quad (5)$$

Figure 6:
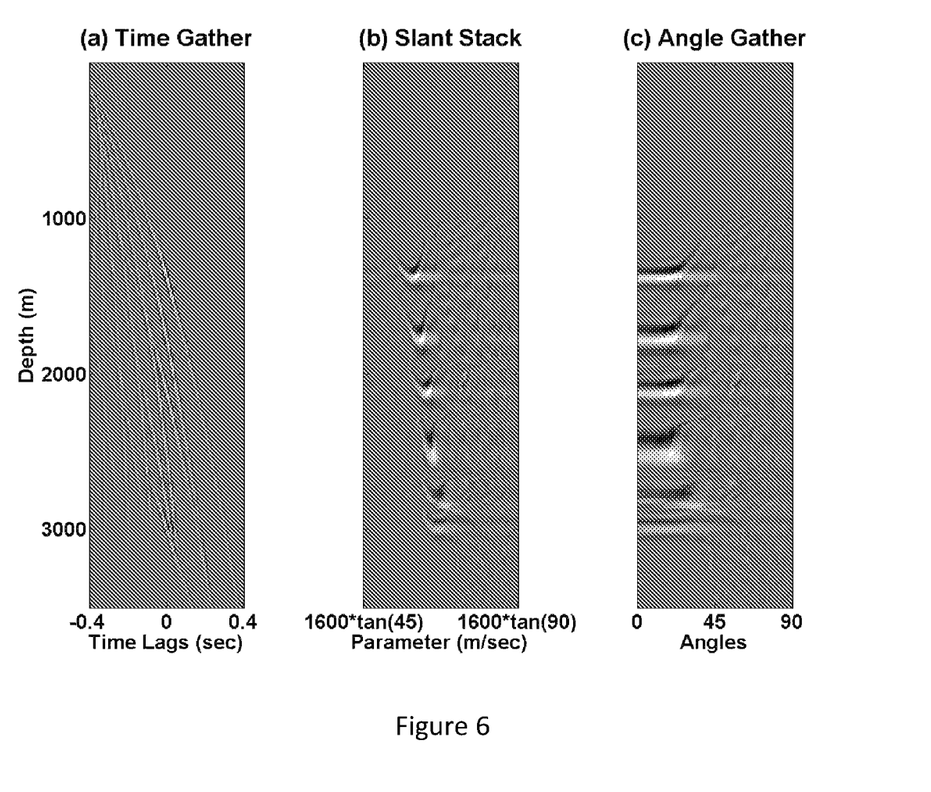
FIG. 6(a) is a z-τ time gather extracted at an x location marked on the image in FIG. 1(a).
FIG. 6(b) is the corresponding slant stack.
FIG. 6(c) is the angle gather for the same x location.
Figure 7:
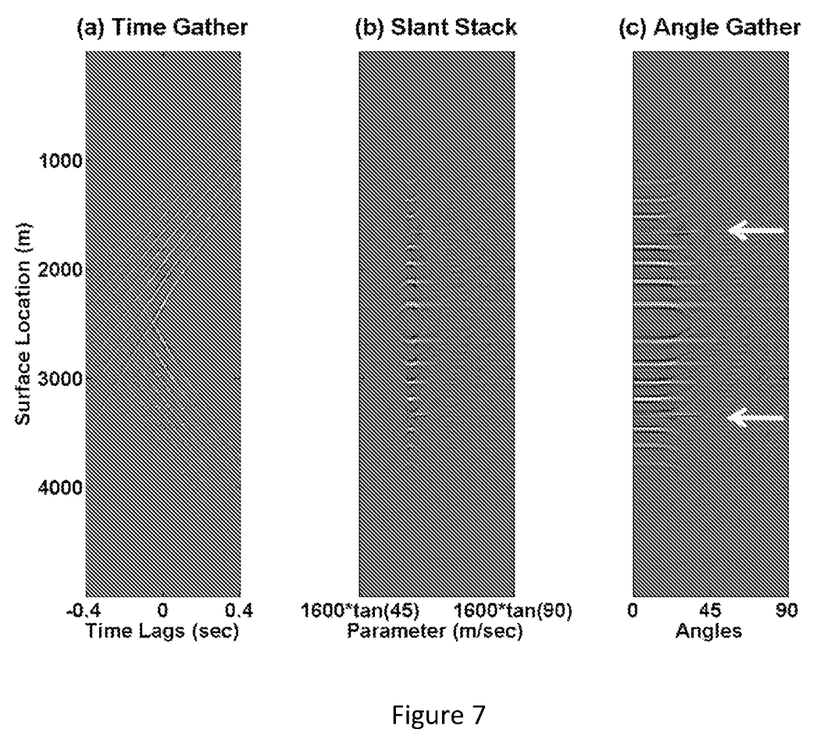
FIG. 7(a) is an x-τ time gather extracted at a z location marked on the image in FIG. 1(a).
FIG. 7(b) is the corresponding slant stack.
FIG. 7(c) is the angle gather for the same z location.
Figure 8:
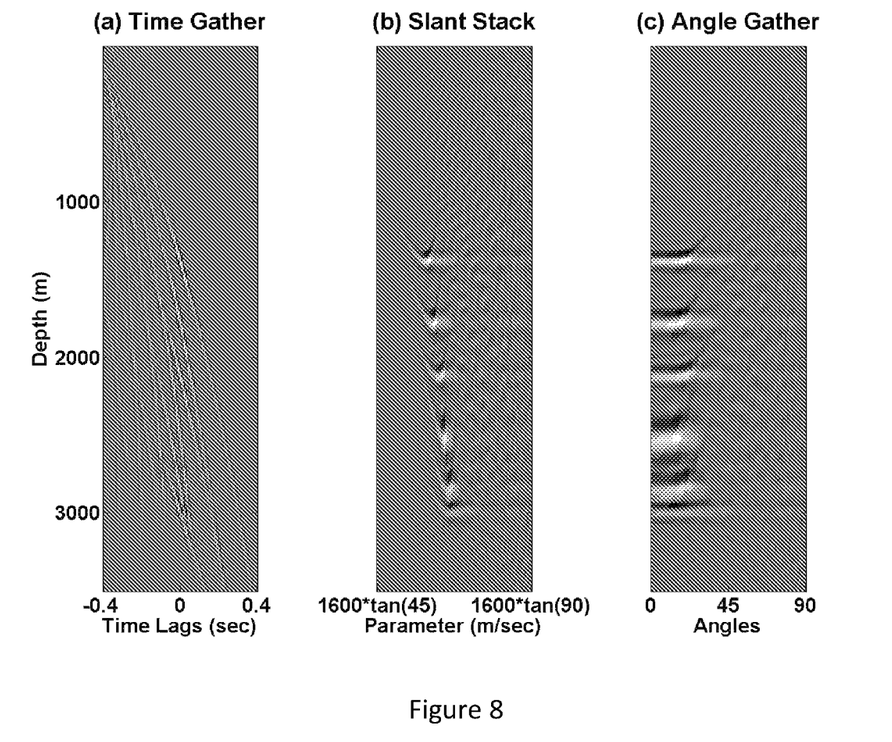
FIGS. 8(a)-8(c) and 9(a)-9(c) each show time gather, slant stack gather and angle gather for the given x and z location respectively.

Here, $\tau_m$ is the derivative of time lags with respect to the reflector normal. As discussed earlier it is measured by slant stacking normal to the reflector dip. Notice, there is no dip correction term and the dip is implicitly included in the slant-stack operation itself. However, this makes the slant stack process dependent on the quality of dip field. As would be evident from FIGS. 6(a), 6(b), and 6(c), we could not capture the vertical event indicated by the arrows even with this method. Although, we provide an improved and accurate slant stack process, the quality of final result is still limited by the quality of input dip field. FIGS. 6(a), 6(b) and 6(c) show time gather, slant stack and angle gather for the x location. The plots directly correspond to the ones in FIGS. 2(a), 2(b), and 2(c). FIGS. 7(a), 7(b), and 7(c) show the same for the z location, with plots corresponding to FIGS. 3(a), 3(b), and 3(c). Again, notice the events around the arrows, they appear much better compared to the ones shown in FIG. 3(c). As mentioned earlier, the vertical event is still missing due to an inaccurate input dip field.

Slant Stacking Along the Direction Normal to the Reflector Dip in Wavenumber Domain:

In the third and final method, we propose to do the slant stack normal to the dip (for all possible dips) as previously described but without using an explicit dip field. Slant stack is now carried out in the wavenumber domain and dip is expressed as a function of respective wavenumbers. In general, slant stack normal to the dip can be described as, $$I(x, y, z, \gamma) = \sum_\tau I(x + \gamma\tau f_x(\varphi, \alpha), y + \gamma\tau f_y(\varphi, \alpha), z + \gamma\tau f_z(\varphi, \alpha), \tau) \quad (6)$$

Here $\gamma$ is the slant stack parameter (units of velocity) and $\tau$ is the time lag. $f_x$, $f_y$ and $f_z$ are dip ($\varphi$) and azimuth ($\alpha$) dependent functions, essentially the components of normal along the coordinate axes. When the slant stack is done along the Z-axis $f_z$ is equal to 1 and the other two functions, $f_x$ and $f_y$, are zero. In 2D, the slant stack normal to the reflector dip can be expressed using the following equation, $$I(x, z, \gamma) = \sum_\tau I(x + \gamma\tau\sin(\varphi), z + \gamma\tau\cos(\varphi), \tau) \quad (7)$$

Here, we propose to implement this in Fourier domain. The dip ($\varphi$) can be expressed in terms of wavenumbers ($k_x$ and $k_z$) as $\varphi=\tan^{-1}(k_x/k_z)$. The spatial lags in equation (7) would correspond to phase shifts in the wavenumber domain and after a little simplification one obtains equation (8).

$$I(k_x, k_z, \gamma) = \sum_\tau I(k_x, k_z, \tau) e^{i\gamma\tau\sqrt{k_x^2+k_z^2}} \quad (8)$$

In this implementation one would need two additional Fourier transforms but the need for an explicit dip field is eliminated. A given combination of wavenumbers, $k_x$ and $k_z$ correspond to a unique dip angle. Hence, using a pair of $k_x$ and $k_z$ in equation (8) would be equivalent of stacking normal to a dip that is determined by the value of $k_x$ and $k_z$. When we span a range of these wavenumbers we effectively slant stack normal to the dip, for a range of dip values. In practice, we slant stack over all possible dip values. We can extend equation (8) to 3D as follows, $$I(k_x, k_y, k_z, \gamma) = \sum_\tau I(k_x, k_y, k_z, \tau) e^{i\gamma\tau\sqrt{k_x^2+k_y^2+k_z^2}} \quad (9)$$

Figure 9:
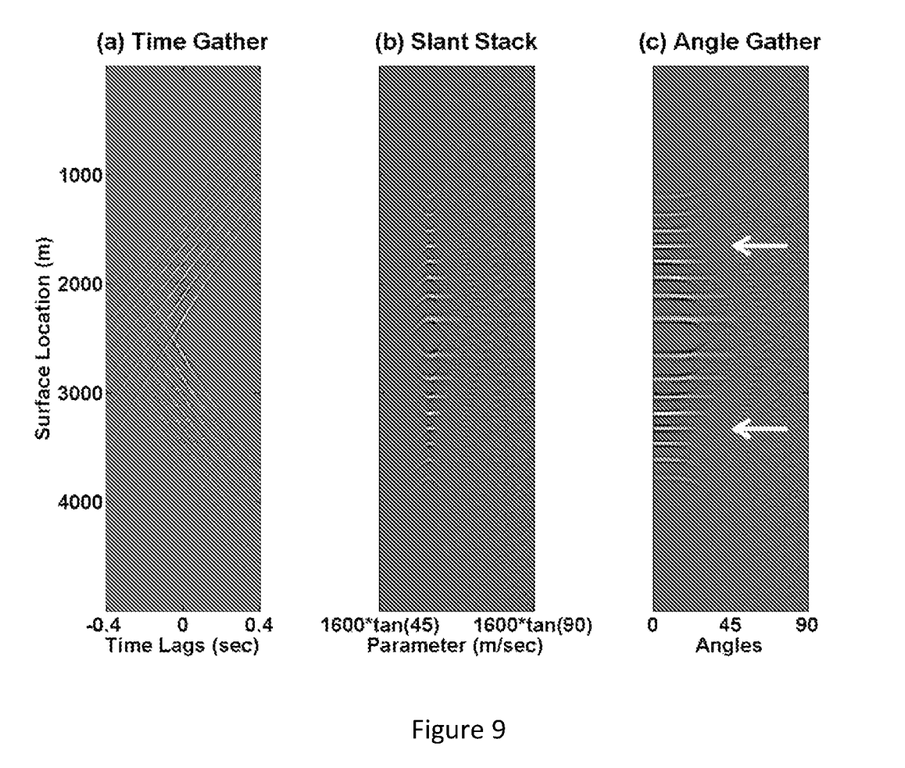

This procedure can also be carried out in space domain by slant stacking normal to the reflector dip (previous method) for not just one dip angle but for all the possible dip angles. After the slant stack one may use the same procedure for angle conversion as was used in the previous (second) method. FIGS. 8(a)-8(c) and 9(a)-9(c) show time gather, slant stack gather and angle gather for the given x and z location respectively. The slant stacks are much cleaner; they do not have any imprint of the dip field. Angle gathers in FIG. 9(c) show all the events including the vertical event (marked by arrows). Our angle transformation is no longer limited by the quality of the dip field. Since, we account for all possible dip geometries we observe noticeable improvement in gather quality when conflicting dips are present.

All the methods discussed above show remarkable improvement in the quality of angle gathers for steeply dipping events. The improvement is also noticed in terms of resolution of gathers as well as the cost of slant stacks.

Although, the methods described here show enhancement in the quality of output angle gathers, they can be improved upon even further. In the methods above, we perform the slant stack normal to the dip in either space or wavenumber domain along straight lines. The events on the time lag gathers are approximated fairly well using these straight lines; however, these events may actually have some curvature. In that case, the process of stack can be generalized to contours other than straight lines to represent these events more closely. The contours can either be velocity dependent functions that accurately mimic our observations or alternatively calculated by tracing rays through the medium. Also, the process of stack itself can be modified by formulating it as an inverse problem, possibly in a least squares sense. This would increase the cost of stack but can lead to improved quality.

In an inverse problem the angle gathers can be estimated that when modeled back to time lags minimized a misfit measure between modeled and real time lag gathers. One could also make gathers with space lags rather than time lags or space lags as well as time lags. The angle gathers can be calculated as mappings from the set on time and or space lag gathers to angle. Again these could be implemented as a stacking process or an inversion problem. The inversion problem could be least squares or it could be optimizing some other measure of the misfit of predicted lag gathers from a modeled angle gather. Again all these mappings could be done as a function of dip.

Other dip estimation and dip decomposition methods could also be used. The image could be decomposed into dips with a Curvelet transform, a local slant stack, a diplet decomposition or any other method that decomposes the image into subsets with a coordinate of image dip.

Figure 10:
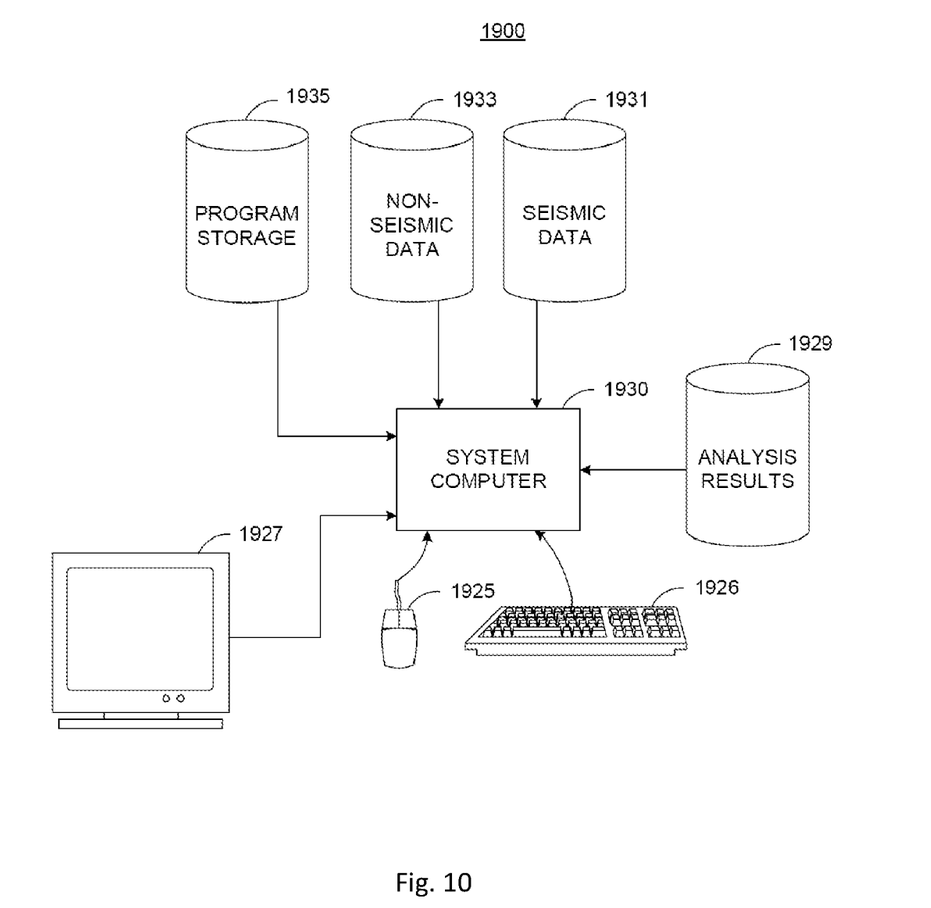
FIG. 10 shows a computer data processing system that is used to implement one of the above methods.

The methods described above are typically implemented in a computer system 1900, one of which is shown in FIG. 10. The system computer 1930 may be in communication with disk storage devices 1929, 1931, 1933 and 1935, which may be external hard disk storage devices. It is contemplated that disk storage devices 1929, 1931, 1933 and 1935 are conventional hard disk drives, and as such, will be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1931. Various non-seismic data from different sources may be stored in disk storage device 1933. The system computer 1930 may retrieve the appropriate data from the disk storage devices 1931 or 1933 to process data according to program instructions that correspond to implementations of various techniques described herein. The program instructions may be written in a computer programming language, such as C++, Java and the like. The program instructions may be stored in a computer-readable medium, such as program disk storage device 1935. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928 (not shown). The system computer 1930 may store the results of the methods described above on disk storage 1929, for later use and further analysis. The keyboard 1926 and the pointing device (e.g., a mouse, trackball, or the like) 1925 may be provided with the system computer 1930 to enable interactive operation.

The system computer 1930 may be located at a data center remote from an exploration field. The system computer 1930 may be in communication with equipment on site to receive data of various measurements. The system computer 1930 may also be located on site in a field to provide faster feedback and guidance for the field operation. Such data, after conventional formatting and other initial processing, may be stored by the system computer 1930 as digital data in the disk storage 1931 or 1933 for subsequent retrieval and processing in the manner described above. While FIG. 19 illustrates the disk storage, e.g. 1931 as directly connected to the system computer 1930, it is also contemplated that the disk storage device may be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

While illustrative embodiments of the invention have been illustrated and described, it will be appreciated that various changes can be made therein without departing from the spirit and scope of the invention.

We claim:

1. A method for converting time shift gather data to angle gather data for geophysical exploration, wherein there is a dip and the dip angle is non-zero, the method comprising:
    slant stacking the time shift gather data along a direction that is normal to the dip.

2. The method of claim 1, wherein slant stacking the time shift gather data along the direction that is normal to the dip comprises:
    performing a least-square inversion to obtain slant stack.

3. The method of claim 1, further comprising:
    receiving an explicit dip field around the dip; and
    wherein the slant stacking is performed in a space domain.

4. The method of claim 1, further comprising:
    slant stacking for velocities in a vicinity of a local velocity at the dip.

5. The method of claim 1, further comprising:
    selecting another dip; and
    slant stacking data along a direction that is normal to the selected another dip.

6. The method of claim 1, wherein the slant stacking the time shift gather data along the direction that is normal to the dip comprises:
    stacking along a straight line; or
    stacking along a curved contour which is velocity dependent.

7. The method of claim 1,
    wherein the slant stacking is performed in a curvelet domain; or
    wherein the slant stacking is performed in a diplet domain.

8. A method for converting time gather data to angle gather data for geophysical exploration, wherein there is a dip and the dip angle is non-zero, the method comprising:
    slant stacking data along a direction that is normal to the dip, wherein the slant stacking is performed in a wave-number domain.

9. The method of claim 8, further comprising:
    selecting a plurality of dips; and
    slant stacking data along a direction that is normal to each selected dip in the wave-number domain.

10. A method for converting time shift gather data to angle gather data for geophysical exploration, wherein there is a dip and the dip angle is non-zero, the method comprising:
    slant stacking the time shift gather data along plural orthogonal coordinate axes;

applying dip correction along each axis; and stacking gathers obtained by the slant stacking for the plural orthogonal coordinate axes with weights to form angle gathers.

11. The method of 10, wherein each weight is dip dependent.

12. The method of 10, wherein the plural orthogonal coordinate axes include X, Y and Z axes, and wherein the weights are calculated based on direction cosine of a normal direction to the dip along the plural orthogonal coordinate axes.

13. The method of 10, wherein the dip angle is greater than about sixty degrees.

14. The method of 10, further comprising:

identifying migration velocity errors from the angle gathers.

15. A system for converting time shift gather data to angle gather data for geophysical exploration, wherein there is a dip and the dip angle is non-zero, the system comprising:

a processor, and a computer readable medium containing instructions when executed by the processor, to:

slant stack the time shift gather data along a direction that is normal to the dip.

16. The system of claim 15, wherein the instructions further cause the processor to:

receive an explicit dip field around the dip; and wherein the slant stacking is performed in a space domain.

17. The system of claim 15, wherein the instructions further cause the processor to:

select another dip; and slant stack data along a direction that is normal to the selected another dip.

18. The system of claim 15, wherein the slant stacking is performed in a wave-number domain.

19. A non-transitory computer readable media containing instructions when executed by a computer, to convert time shift gather data to angle gather data for geophysical exploration, wherein there is a dip and the dip angle is non-zero, by:

slant stacking the time shift data along plural orthogonal coordinate axes;

applying dip correction along each axis; and stacking gathers obtained by the slant stacking for the plural orthogonal coordinate axes with weights to form angle gathers.

20. The computer readable media of 19, wherein each weight is dip dependent.

21. The method of claim 8, wherein performing the slant stacking in the wave-number domain comprises performing the slant stacking with the dip represented in the wave-number domain.

22. The method of claim 8, further comprising:

performing Fourier transforms to represent the dip in the wave-number domain.

\* \* \* \* \*